United States Patent
Salehpour et al.

(10) Patent No.: US 10,158,662 B1
(45) Date of Patent: Dec. 18, 2018

(54) SCANNING FOR AND REMEDIATING SECURITY RISKS ON LIGHTWEIGHT COMPUTING DEVICES

(71) Applicant: Symantec Corporation, Mountain View, CA (US)

(72) Inventors: Jonathon Salehpour, Upland, CA (US); Somard Kruayatidee, Stevenson Ranch, CA (US)

(73) Assignee: Symantec Corporation, Mountain View, CA (US)

( * ) Notice: Subject to any disclaimer, the term of this patent is extended or adjusted under 35 U.S.C. 154(b) by 295 days.

(21) Appl. No.: 15/242,200

(22) Filed: Aug. 19, 2016

(51) Int. Cl.
  *G06F 9/00* (2006.01)
  *G06F 21/70* (2013.01)
  *G06F 21/82* (2013.01)
  *H04L 29/06* (2006.01)

(52) U.S. Cl.
  CPC ............ *H04L 63/1441* (2013.01); *G06F 9/00* (2013.01); *G06F 21/70* (2013.01); *G06F 21/82* (2013.01); *H04L 63/20* (2013.01)

(58) Field of Classification Search
  CPC ....... H04L 63/20; H04L 63/1441; G06F 9/00; G06F 21/70; G06F 21/83
  See application file for complete search history.

(56) References Cited

U.S. PATENT DOCUMENTS

| 8,161,552 B1* | 4/2012 | Sun ...................... G06F 21/566 726/22 |
| 2010/0154062 A1* | 6/2010 | Baram .................. G06F 21/564 726/24 |
| 2014/0223543 A1* | 8/2014 | Jeansonne ............... G06F 21/53 726/16 |

FOREIGN PATENT DOCUMENTS

JP      2003182166 A * 7/2003 ............. G06F 21/56

* cited by examiner

*Primary Examiner* — Joseph P Hirl
*Assistant Examiner* — Kalish Bell
(74) *Attorney, Agent, or Firm* — Patterson + Sheridan, LLP (57) ABSTRACT

The present disclosure relates to scanning for security threats on a lightweight computing device. An example method generally includes receiving, from a mobile device, a software package including a lightweight computing device security application. A lightweight device transmits, to the mobile device, information identifying at least a first application installed on the lightweight computing device. In response, the lightweight device receives, from the mobile device, information identifying the first application as being a known security threat and remediates a security threat posed by the identified application.

20 Claims, 5 Drawing Sheets

SCANNING FOR AND REMEDIATING SECURITY RISKS ON LIGHTWEIGHT COMPUTING DEVICES

BACKGROUND

Field

Embodiments presented herein generally relate to computer security systems, and more specifically, to remediating security threats on a lightweight computing device (e.g., a wearable or handheld computing device) using an agent application installed on the lightweight computing device.

Description of the Related Art

Lightweight computing devices often support only limited communication capabilities. For example, lightweight computing devices may include a single short-range radio transceiver (e.g., a Bluetooth transceiver), and may be unable to communicate with network hosts directly (i.e., may not have a direct connection to the internet via the short-range radio transceiver). To communicate with resources on a network, a lightweight computing device may connect to a gateway device, such as a mobile phone, handheld computer, or tablet, having access to the internet (e.g., via a cellular data network or a wireless local area network).

Applications developed for lightweight computing devices are generally installed from the gateway device. A lightweight computing device application package (which may be a standalone application or a companion to an application installed on the gateway device) may be installed on a connected lightweight computing device through a device management console, which pushes the lightweight computing device application package to the lightweight computing device. A user may see what applications are installed through a pairing between the gateway device and the lightweight computing device using the device management console.

In some cases, applications installed on a lightweight computing device may include malicious components. Some of these malicious applications may render a lightweight computing device unusable; however, some malicious components may capture data from a wearable device. For example, a malicious application on a lightweight computing device may activate audio and/or video recording capabilities on a lightweight computing device and upload the recorded audio and/or video, via the companion application on the gateway device, to a remote location. In another example, a malicious application could obtain sensor data from the lightweight computing device (e.g., accelerometers or gyroscopes) to determine and steal personal PINs or passwords from a user.

SUMMARY

One embodiment of the present disclosure includes a method for scanning for security threats on a lightweight device. The method generally includes receiving, from a mobile device, a software package including a lightweight computing device security application. A lightweight device transmits, to the mobile device, information identifying at least a first application installed on the lightweight computing device. In response, the lightweight device receives, from the mobile device, information identifying the first application as being a known security threat and remediates a security threat posed by the identified application.

Another embodiment provides a computer-readable storage medium having instructions, which, when executed on a processor, performs an operation for scanning for security threats on a lightweight device. The operation generally includes receiving, from a mobile device, a software package including a lightweight computing device security application. A lightweight device transmits, to the mobile device, information identifying at least a first application installed on the lightweight computing device. In response, the lightweight device receives, from the mobile device, information identifying the first application as being a known security threat and remediates a security threat posed by the identified application.

Still another embodiment of the present invention includes a processor and a memory storing a program, which, when executed on the processor, performs an operation scanning for security threats on a lightweight device. The operation generally includes receiving, from a mobile device, a software package including a lightweight computing device security application. A lightweight device transmits, to the mobile device, information identifying at least a first application installed on the lightweight computing device. In response, the lightweight device receives, from the mobile device, information identifying the first application as being a known security threat and remediates a security threat posed by the identified application.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Lightweight computing devices are generally controlled using applications on an internet-enabled gateway device (e.g., a mobile phone or tablet computer with a cellular transceiver) and on which applications can be installed using the gateway device. Lightweight computing devices include wearable devices (app-enabled fitness bands, smartwatches, etc.), app-enabled automobile multimedia units, Internet-of-Things devices, and so on.

Generally, the gateway device (again, e.g., a mobile phone paired with a given lightweight computing device) hosts a management console for the lightweight computing device that allows a user to see the applications are installed or otherwise configured on the lightweight computing device. When a lightweight computing device is paired with a gateway device, the gateway device may also display information about applications that the gateway device installs on the lightweight computing device. However, in some cases, the gateway device may be unable to display information about applications installed before the lightweight computing device was paired with the gateway device.

Embodiments presented herein provide techniques for scanning for and remediating security vulnerabilities (e.g., malware) on lightweight computing devices. A gateway device installs a security agent on the lightweight computing device when the lightweight computing device is paired with a gateway device. The security agent generates a list of applications installed on the lightweight computing device and transmits a report with one or more of the list of installed applications and device information (e.g., operating system/firmware version information) to a counterpart security application on the gateway device for processing. The report may be transmitted, for example, to a gateway device using a general purpose data transfer mechanism that allows applications executing on a gateway device to communicate with counterpart applications executing on a lightweight computing device. In response, the security agent on the lightweight computing device receives, from the counterpart security application on the gateway device, a list of applications identified as security threats. The security agent can take action to remediate the identified security threats, such as deleting the identified applications from the lightweight computing device or blocking access to network interfaces and/or input devices on the lightweight computing device.

Advantageously, by deploying a security agent to a lightweight computing device when the lightweight computing device is paired with a gateway device, the security agent can identify applications that have been previously installed on the lightweight computing device and which may not be visible to the owner of the gateway device. The security agent pushed to the lightweight may remediate security threats posed by such applications. Remediation of security threats may, for example, prevent applications from surreptitiously capturing data recorded on the wearable device to an unknown (and potentially malicious) destination or prevent malware from spreading from a lightweight computing device to a newly paired gateway device.

Figure 1:
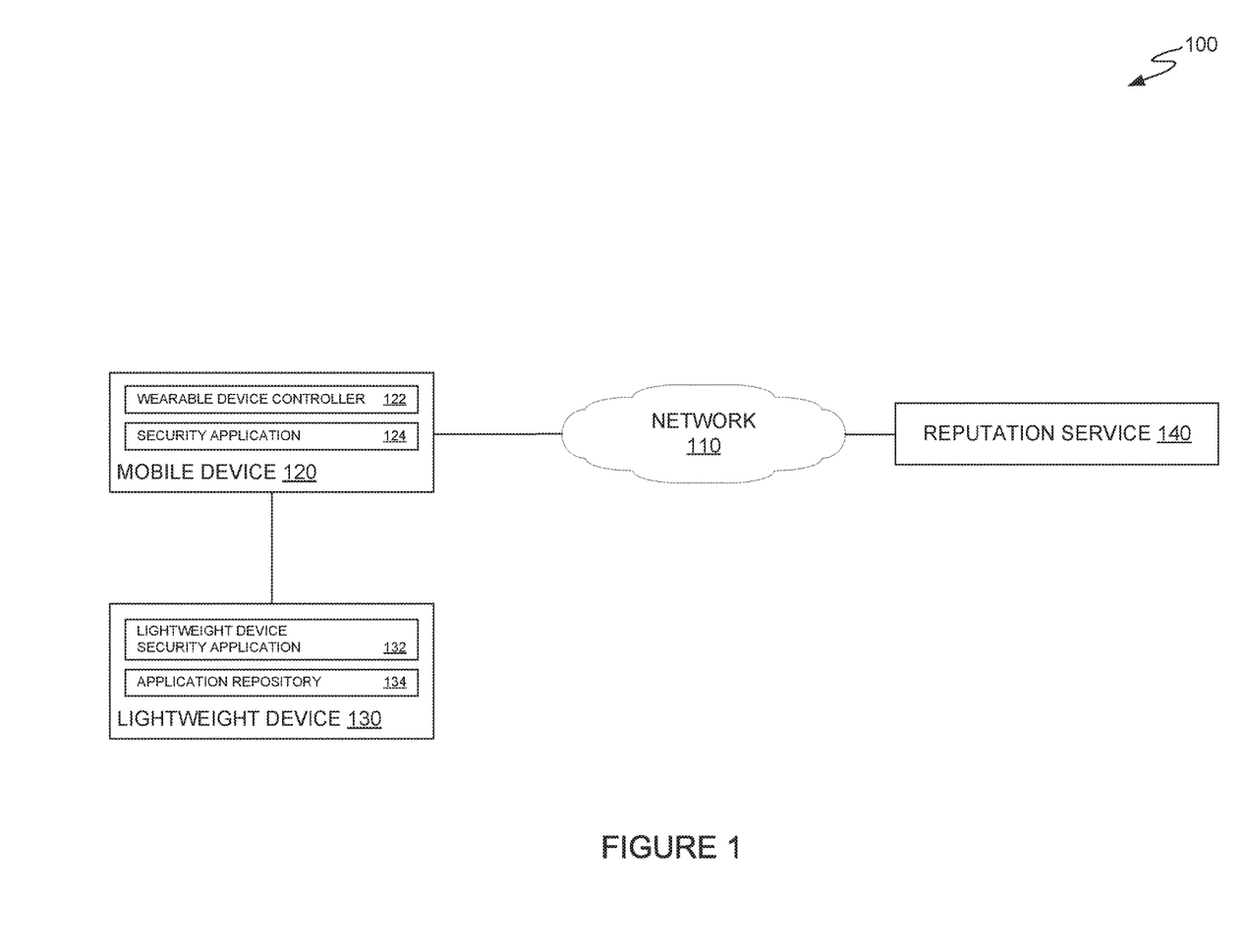
FIG. 1 illustrates an example of a networked computing environment, according to one embodiment.

FIG. 1 illustrates an example networked computing environment 100, according to an embodiment. As illustrated, computing environment includes a mobile device 120 and a reputation service 140 connected through network 110. One or more lightweight computing devices 130 (e.g., a wearable device, connected automobile multimedia unit, connected television, or other internet-of-things (IoT) devices) may be connected to mobile device 120 (e.g., via Bluetooth or other short-range radio interfaces).

As illustrated, mobile device 120 includes a lightweight computing device controller 122 and a security application 124. Lightweight computing device controller 122 generally provides an interface for a user to connect with and manage wearable device 130. Lightweight computing device controller 122 additionally may push applications (e.g., lightweight computing device counterpart applications related to applications installed on mobile device 120) to lightweight computing device 130. In an example, lightweight computing device controller 122 can provide a user interface that allows a user to search for lightweight computing devices 130 in the vicinity of mobile device 120 (e.g., within communications range of a Bluetooth radio at mobile device 120). The lightweight computing device controller 122 can display data identifying the one or more lightweight computing devices 130 found during the search and allow a user to pair, or establish a connection with, one or more of the lightweight computing devices 130.

In some cases, when lightweight computing device controller 122 initially pairs with a newly discovered lightweight computing device 130, lightweight computing device controller 122 can scan mobile device 120 for applications installed on mobile device 120 that include a lightweight computing device counterpart application (e.g., a wearable counterpart application. These applications may include, for example, wearable device counterparts to banking applications, payment applications on wearable devices, personal organizer applications, fitness applications, and so on. Lightweight computing device controller 122 can automatically push the lightweight computing device counterpart applications to the lightweight computing device 130 or present a selection interface to a user on mobile device 120 that allows a user to select which lightweight computing device applications to install on lightweight computing device 130.

Security application 124 generally includes a lightweight computing device counterpart application (e.g., lightweight computing device security application 132) that wearable device controller can install on a lightweight computing device 130. In some cases, the lightweight computing device controller 122 can automatically install the lightweight computing device counterpart application on lightweight computing device 130 when a user initially pairs a lightweight computing device 130 with mobile device 120. In some cases, device controller 122 can automatically install the lightweight computing device counterpart application on a previously paired lightweight computing device 130 when a user downloads and installs security application 124 on mobile device 120.

Security application 124 is generally configured to receive a list of applications installed on lightweight computing device 130 and identify potential security vulnerabilities that may be present on lightweight computing device 130. In some cases, security application 124 can receive the list of applications as a list of application package names or other data that uniquely identifies each application installed on lightweight computing device 130. For each application in the list of applications received from lightweight computing device security application 132 on lightweight computing device 130, security application 124 can request information about the application from a reputation service 140.

In some cases, security application 124 may receive the list of applications installed on lightweight computing device 130 in response to the wearable device controller 122 installing and activating lightweight computing device security application 132 on the lightweight computing device 130. Security application 124 may be configured to receive the list of applications from lightweight computing device security application 132 through a general purpose data transfer mechanism that allows applications executing on mobile device 120 to communicate with counterpart applications executing on a lightweight computing device 130. In one example, security application 124 can receive the list of applications as a message transferred as part of a remote procedure call. In another example, security application 124 can receive the list of applications as a binary object (e.g., a bitstream). In such a case, security application 124 can recreate the list of applications by converting the bitstream into a string (e.g., a series of Unicode or ASCII characters, depending on the encoding used by lightweight computing device security application 132) and parsing the string into a list of application package names. Security application 124 can receive information about the applications executing on lightweight device 130 as a list of application package names, hashes of each application installed on the lightweight computing device 130, or other data that uniquely identifies each application installed on the lightweight computing device 130

The data received from reputation service 140 may indicate whether an application is "trusted" (i.e., is not malicious), is unknown, or is "untrusted" (i.e., is malicious). For applications that are identified by reputation service 140 as "trusted," security application 124 need not take any further action. For applications that reputation service 140 identifies as "untrusted," security application 124 can identify one or more remediation actions for lightweight computing device security application to perform on the application. The one or more remediation actions may include, for example, deleting the application from lightweight computing device 130, blocking the application from accessing network interfaces on mobile device 120 and/or lightweight computing device 130, blocking access input devices on lightweight computing device 130, and so on.

After security application 124 obtains reputation data for each of the applications installed on the lightweight computing device 130, security application 124 can generate a list of applications that have been identified as security threats or vulnerabilities and transmit the list to lightweight computing device security application 132 on lightweight computing device 130. In some cases, the list of applications may include one or more remediation actions associated with each application identified as a security threat or vulnerability. To transmit the list to lightweight computing device security application 132, security application 124 can, for example, invoke a remote procedure call and transmit a message including the list of applications (and, in some cases, the one or more associated remediation actions) to lightweight computing device 130. In another case, security application 124 can transmit the list of applications and the one or more associated remediation actions to lightweight computing device security application 132 on lightweight computing device 130 as a bitstream for processing on lightweight computing device 130.

In some cases, security application 124 may maintain a separate list of unknown applications and periodically query reputation service 140 for information about the unknown applications. If reputation service 140 returns reputation data for an application on the list of unknown applications (i.e., that the application is "trusted" or "untrusted"), security application 124 can remove the application from the list of unknown applications. If reputation service 140 identifies an application on the list of unknown applications as a "trusted" application, security application 124 need not take any further action with respect to that application. If, however, reputation service 140 indicates that an application is "untrusted," security application 124 can generate a message including an identity of the application (e.g., application package name) and, in some cases, one or more remediation actions to perform with respect to the application, to lightweight computing device security application 132 on lightweight computing device 130.

Lightweight computing device 130 may be a wearable device, smartwatch, app-enabled television, app-enabled automobile multimedia unit, IoT device, or other device that can be controlled from mobile device 120. As illustrated, lightweight computing device 130 generally includes a lightweight computing device security application 132 and an application repository 134.

Lightweight computing device security application 132, as discussed above, is generally installed on the lightweight computing device 130 when a user initially pairs the wearable device 130 with mobile device 120 or when a user installs the corresponding security software on mobile device 120. Lightweight computing device security application 132 may execute as a background application on the lightweight computing device 130.

When lightweight computing device 130 connects to a mobile device 120, lightweight computing device security application 132 can scan application repository 134 to generate a list of applications installed on lightweight computing device 130. As discussed, the list of applications may be generated as a list of package names, hashes of each application installed on the lightweight computing device 130, or other data that uniquely identifies each application installed on the lightweight computing device 130. Lightweight computing device security application 132 can transmit the list of applications installed on the lightweight computing device 130, for example, as a message in part of a remote procedure call or as a bitstream. By transmitting the list of applications installed on lightweight computing device 130, lightweight computing device security application 132 can invoke reputation querying processes (or other malware/vulnerability analysis processes) in security application 124 executing on mobile device 120.

In response, lightweight computing device security application 132 can receive a message from security application 124 executing on mobile device 120 identifying applications in application repository 134 that are potential security vulnerabilities. Based on the received message, lightweight computing device security application 132 can take one or more actions to remediate the identified security vulnerabilities on lightweight computing device 130. For example, lightweight computing device security application 132 may be configured to delete any applications included in a list of potential security vulnerabilities from application repository 134. In other cases, lightweight computing device security application 132 can block any of the identified applications from accessing input devices (e.g., microphones, cameras, and so on) or network interfaces, which may prevent such applications from capturing and transmitting data to a remote source through mobile device 120.

In some cases, lightweight computing device security application 132 may additionally receive, from security application 124, specific remediation procedures for each identified application. For example, lightweight computing device security application 132 may receive a list of two-tuples of {application identifier, remediation action}. The remediation action may be a series of bits identifying a specific action to be performed with respect to the associated application; for example, a first bit pattern may indicate that lightweight computing device security application 132 is to terminate the application and delete the application from application repository 134, a second bit pattern may indicate that lightweight computing device security application 132 is to block the application from accessing input devices on the lightweight computing device 130, and so on. In such a case, lightweight computing device security application 132 can perform the identified remediation procedures.

In some cases, lightweight computing device security application 132 may be configured to execute in the background, which may allow security application 124 to transmit updates or new remediation instructions to lightweight computing device security application 132. For example, if security application 124 receives reputation information about a previously unknown application installed on lightweight computing device 130 (as discussed above), lightweight computing device security application 132 can receive data identifying the application (and, in some cases, the associated remediation action) without transmitting another request to security application 124.

Reputation service 140 generally may be an existing service that uses data gathered from application analysis (e.g., from executing applications in a controlled environment and analyzing application actions, network traffic generated by the application, and so on) and/or crowd-sourced data to determine whether applications and network destinations are trusted, untrusted, or unknown. In some cases, reputation service 140 may be hosted in the cloud and accessible by security application 124 via network 110. As new applications and threats are introduced into various computing environments, reputation service 140 may be updated to reflect the reputation of the new applications. For example, when a new version of a mobile banking or payments application for a lightweight computing device is released, reputation service 140 may be updated to reflect that the new version of the lightweight computing device mobile banking or payments app is trusted (like previous versions of the suite). Other applications may initially have an unproven or unknown reputation, and as reputation service 140 receives additional data about the application from other users, reputation service 140 may update the reputation to reflect user feedback or analyzed telemetry about the application.

Figure 2:
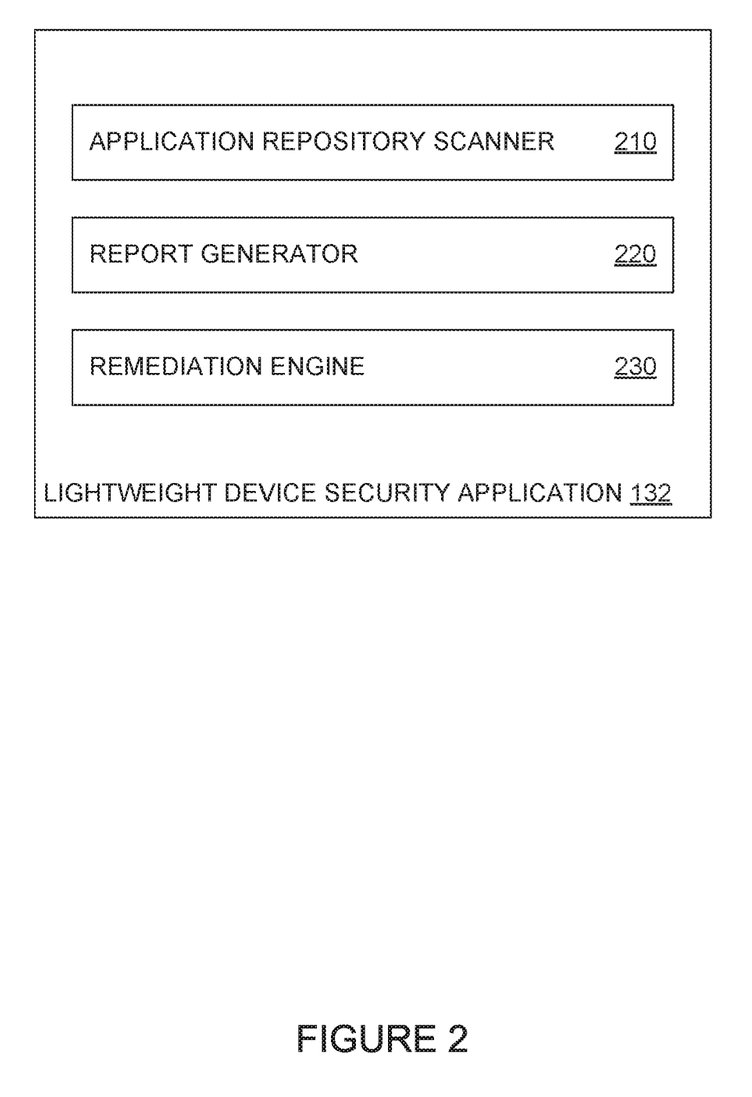
FIG. 2 illustrates an example lightweight computing device security application, according to one embodiment.

FIG. 2 illustrates an example lightweight computing device security application 132, according to an embodiment. As illustrated, lightweight computing device security application 132 generally includes an application repository scanner 210, report generator 220, and remediation engine 230.

Application repository scanner 210 is generally configured to examine storage repositories on a lightweight computing device to generate a list of applications installed on the lightweight computing device. In some cases, application repository scanner 210 may be invoked when lightweight computing device security application 132 is installed on a lightweight computing device 130 (e.g., when lightweight computing device 130 initially pairs with a mobile device 120 or when the corresponding security application 124 is installed on mobile device 120).

Application repository scanner 210 can extract application package names from application storage repositories on the lightweight computing device. In some cases, where each application package name uniquely identifies the application (and the version of the application) installed on a lightweight computing device 130, application repository scanner 210 can provide the application names to report generator 220 for transmission to security application 124 executing on mobile device 120. In some cases, application repository scanner 210 may generate a hash representative of each application package installed on the lightweight computing device. The hash may be a unique "fingerprint" representative of each application installed on the lightweight computing device, such as a SHA hash value or other checksum that can uniquely identify an application.

Report generator 220 generally receives information about the applications installed on the lightweight computing device 130 from application repository scanner 210 and packages the information into a report for transmission to security application 124 executing on mobile device 120. For example, report generator 220 can invoke a remote procedure call and transmit one or more messages with data identifying the one or more applications installed on lightweight computing device 130. In another example, report generator 220 can package the data into a binary object and transmit the binary object to security application 124 executing on mobile device 120. As discussed, report generator 220 can transmit the data identifying the one or more applications installed on lightweight computing device 130 using a general purpose data transfer mechanism that allows applications executing on mobile device 120 to communicate with counterpart applications executing on a lightweight computing device 130.

Remediation engine 230 generally receives data from security application 124 identifying one or more applications in application repository 134 that are security risks. Based on the data received from security application 124, remediation engine 230 can take one or more actions to remediate vulnerabilities present on the lightweight computing device 130. For example, remediation engine 230 may be configured to automatically delete the applications identified in the data from security application 124 from application repository 134 at lightweight computing device 130.

In some cases, remediation engine 230 can receive a list of applications identified by security application 124 to be security risks with one or more remediation actions to be performed with respect to each application in the list of applications. For example, remediation engine 230 can be instructed to delete an application from application repository 134. Remediation engine 230 may, in some cases, be instructed to monitor for and block an application from gathering data from one or more sensors or other input devices (e.g., cameras, microphones, biometric sensors, and so on) on the lightweight computing device 130. In some cases, remediation engine 230 may be instructed to block an application from accessing network interfaces (e.g., a Bluetooth radio interface connecting lightweight computing device 130 to mobile device 120) or other device-to-device interfaces (e.g., a Universal Serial Bus (USB) interface connecting lightweight computing device 130 to mobile device 120).

Figure 3:
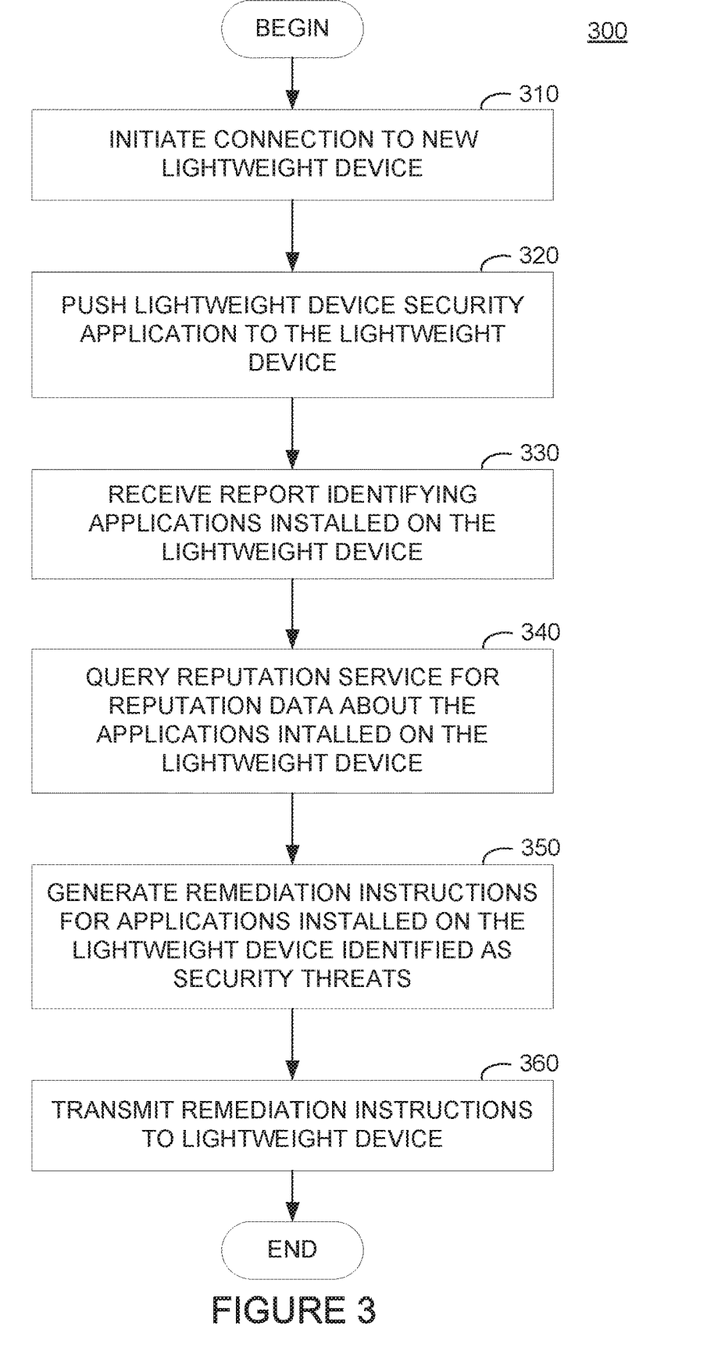
FIG. 3 illustrates example operations for scanning a lightweight computing device for security threats, according to one embodiment.

FIG. 3 illustrates example operations that may be performed by a mobile device 120 to remediate security vulnerabilities on a newly connected lightweight computing device 130 (e.g., a wearable device, connected automobile multimedia unit, IoT devices, and so on), according to an embodiment. As illustrated operations 300 begin at step 310, where the mobile device initiates a connection to a new lightweight computing device. The mobile device may initiate a new connection to a lightweight computing device 130 using, for example, a point-to-point or short range interface, such as a Bluetooth connection. To establish a connection between a mobile device 120 and a lightweight computing device 130, mobile device 120 can scan for lightweight computing devices in the vicinity of the mobile device 120 and present a list of the available devices to a user of mobile device 120. In response to user selection of the lightweight computing device 130, mobile device 120 establishes a connection with lightweight computing device 130.

At step 320, mobile device 120 pushes a lightweight computing device security application to lightweight computing device 130. Pushing the lightweight computing device security application to lightweight computing device 130 generally installs the application on lightweight computing device 130. As discussed, mobile device 120 can push the lightweight computing device security application to lightweight computing device 130 upon establishing a connection with a new lightweight computing device 130. In some cases, mobile device 120 need not request permission from a user to push the lightweight computing device security application to lightweight computing device 130.

At step 330, mobile device 120 receives a report identifying the applications installed on the lightweight computing device. The report may be received via a general purpose data transfer mechanism that allows applications executing on mobile device 120 to communicate with counterpart applications executing on a lightweight computing device 130. Mobile device 120 can receive this report, for example, as a series of messages from a lightweight computing device 130 as part of a remote procedure call to invoke security application 124 executing on mobile device 120 to identify security vulnerabilities present on lightweight computing device 130. In some cases, mobile device 120 can receive the report identifying applications installed on the lightweight computing device as a binary object (e.g., a bitstream). In such a case, security application 124 on mobile device 120 can decode the bitstream according to a predefined encoding scheme (e.g., ASCII, Unicode, EBCDIC, or other encoding schemes) and set of delimiter characters separating each application in the list of applications. In some cases, the report may include the application package name for each application installed on lightweight computing device 130. In some cases, the report may include hash values or other unique fingerprint values representing each application installed on lightweight computing device 130.

At step 340, mobile device 120 queries a reputation service for reputation data about the applications installed on the lightweight computing device. In response, mobile device receives information about the applications installed on the lightweight computing device, which may, for example, indicate if an application is "trusted," "untrusted," or has an unknown reputation. If an application is "trusted," security application 124 on mobile device 120 need not take any further action. If an application has an unknown reputation, as discussed above, security application 124 on mobile device 120 may store data identifying the application for use in generating future queries for reputation data from reputation service 140.

At step 350, mobile device 120 generates remediation instructions for applications installed on the lightweight computing device that are identified as security threats. These applications may be the applications that have an "untrusted" reputation at reputation service 140. In some cases, reputation service 140 can return remediation instructions for each "untrusted" application in the list of applications installed on lightweight computing device 130. If reputation service 140 does not include remediation instructions, security application 124 on mobile device 120 can determine how to remediate threats arising from the "untrusted" applications.

To generate remediation instructions, security application 124 on mobile device 120 can generate one or more messages including data identifying the "untrusted" applications and transmit the messages to the lightweight computing device security application 132 executing on lightweight computing device 130. In such a case, lightweight computing device security application 132 can determine the one or more remediation actions to be performed with respect to the identified applications. In another example, security application 124 executing on mobile device 120 can generate a series of two-tuples of {application identifier, remediation action} for transmission to lightweight computing device security application 132. The remediation action portion of the two-tuple may, for example, be a series of bits indicating specific remediation action to be performed by lightweight computing device security application 132.

At step 360, mobile device 120 transmits the remediation instructions to the lightweight computing device 130. As discussed herein, the mobile device 120 can transmit the remediation instructions to the lightweight computing device 130 as a series of remote procedure call messages, as a binary object or bitstream, or other data transmission using application programming interface (API) functionality for transferring data from a mobile device 120 to a lightweight computing device 130.

Figure 4:
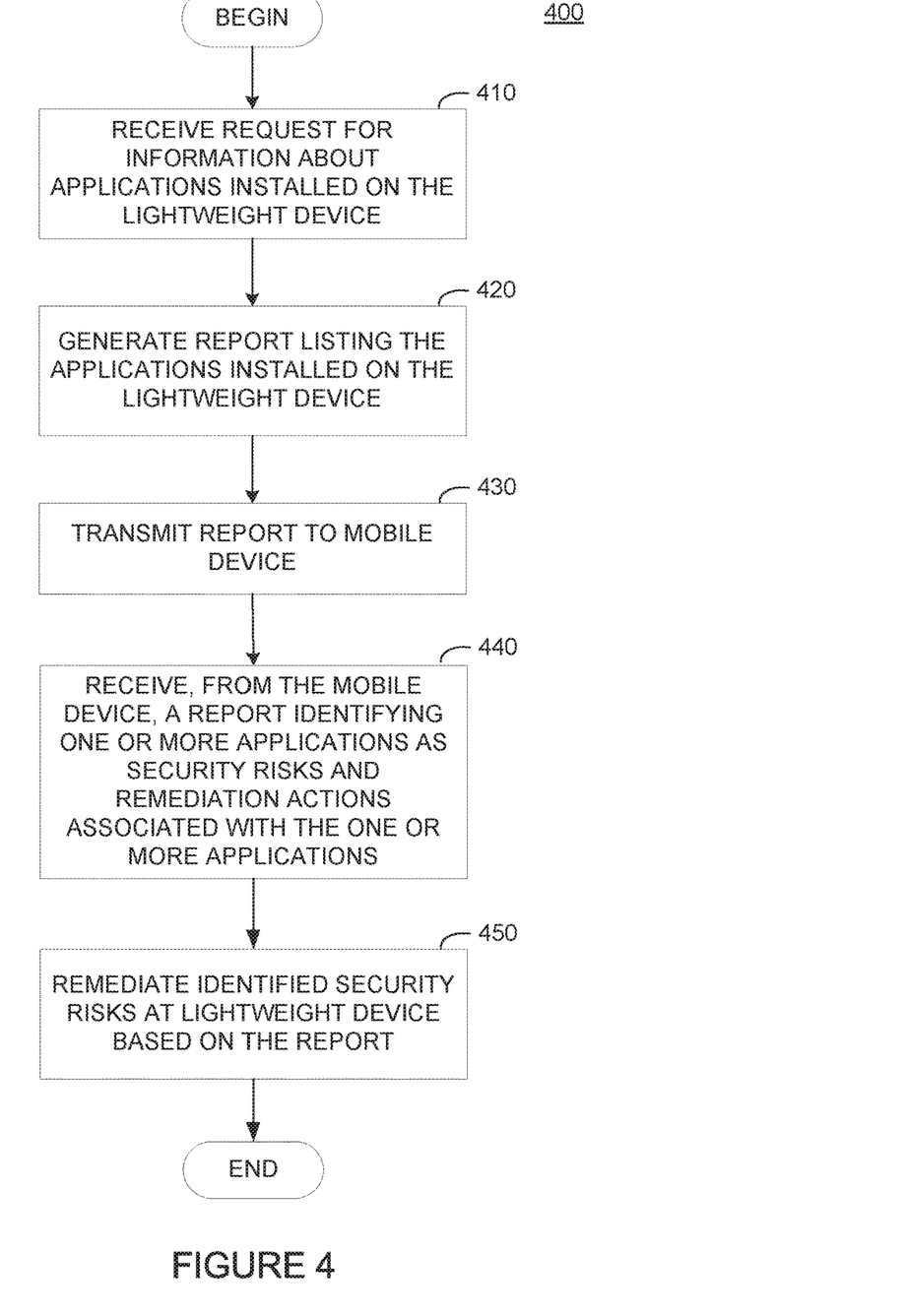
FIG. 4 illustrates example operations identifying security risks and remediation actions to be performed on a lightweight computing device based on application data received from a lightweight computing device, according to one embodiment.

FIG. 4 illustrates example operations that may be performed by a lightweight computing device to remediate security vulnerabilities from applications installed on the lightweight computing device 130, according to an embodiment. As illustrated, operations 400 begin at step 410, where lightweight computing device security application 132 receives a request for information about applications installed on the lightweight computing device. Lightweight computing device security application 132 may receive the request, for example, as a remote procedure call message or other indicator from the corresponding security application 124 executing on mobile device 120.

In response, at step 420, lightweight computing device security application 132 generates a report listing the applications installed on lightweight computing device 130. As discussed, lightweight computing device security application 132 can traverse application repository 134 on lightweight computing device 130 to generate a list of the names of the application packages in application repository 134. In another example, lightweight computing device security application 132 can generate a hash value or fingerprint representing the contents of each application package in application repository 134 and generate a report listing each hash value or fingerprint. At step 430, lightweight computing device security application 430 transmits the report to mobile device 120, where, as discussed, security application 124 executing on mobile device 120 can scan the list of applications for security vulnerabilities installed on lightweight computing device 120.

At step 440, lightweight computing device security application 132 receives, from mobile device 120, a report identifying one or more applications as security risks. In some cases, the report may additionally include remediation actions associated with the one or more applications identified as security risks. As discussed, the report may include a set of two-tuples of {application identifier, remediation action}, where the remediation action identifies one of one or more actions (e.g., deleting the application, blocking application access to input devices, blocking application access to network interfaces, and so on) that lightweight computing device security application is to perform with respect to a specific application. Lightweight computing device security application 132 may, for example, receive the report identifying one or more applications as security risks via a general purpose data transfer mechanism that allows applications executing on mobile device 120 to communicate with counterpart applications executing on a lightweight computing device 130.

At step 450, lightweight computing device security application 132 remediates the identified security risks based on the report received from the mobile device. In some cases, where the report identifies applications that are security risks but does not include remediation instructions, lightweight computing device security application 132 can determine the remediation action to perform for each identified application. For example, lightweight computing device security application 132 can automatically delete each of the identified applications. If the report includes remediation instructions for each application identified as a security risk, lightweight computing device security application 132 can perform the identified remediation action for each application included in the report.

Figure 5:
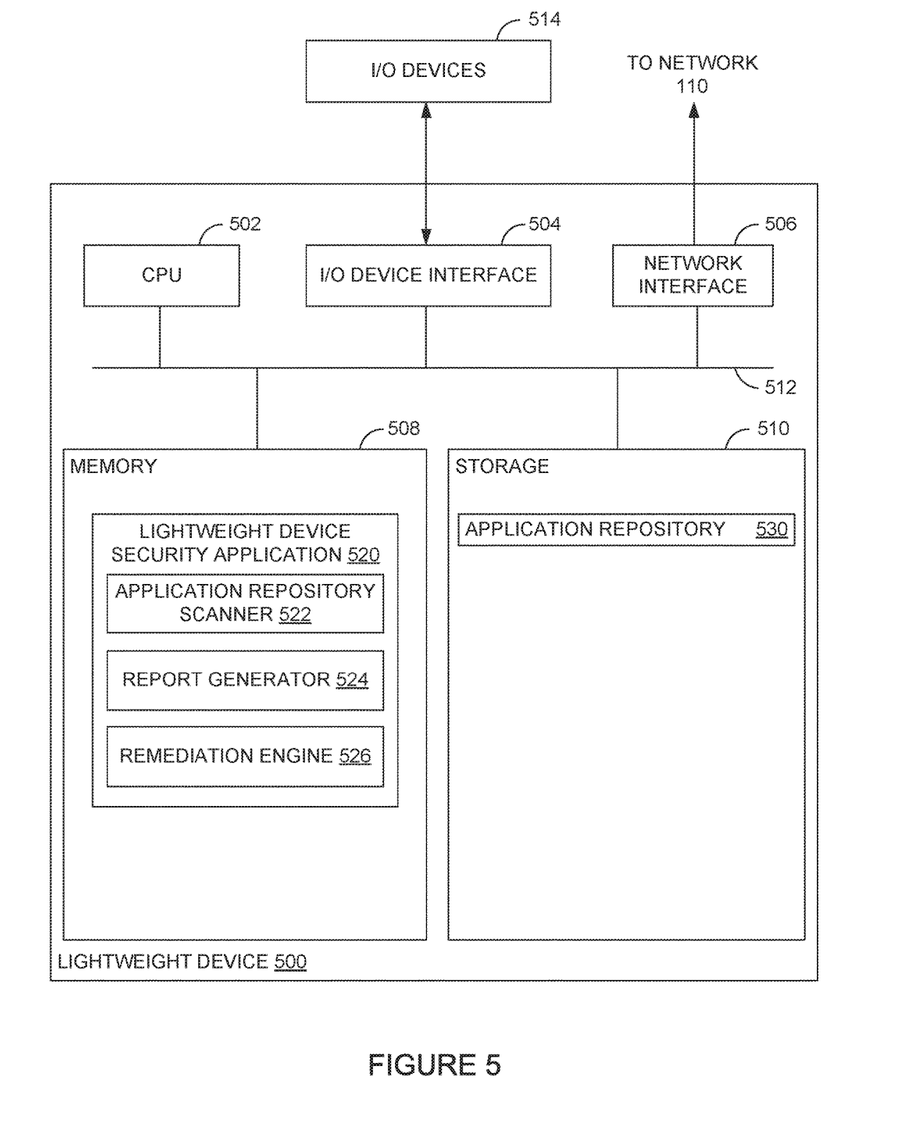
FIG. 5 illustrates an example computing system for scanning for and remediating security risks on a lightweight computing device, according to one embodiment.

FIG. 5 illustrates an example lightweight computing device 500 that scans an application repository for applications installed on lightweight computing device 500 to remediate security vulnerabilities present on lightweight computing device 500, according to an embodiment. As shown, the lightweight computing device 500 includes, without limitation, a central processing unit (CPU) 502, one or more I/O device interfaces 504 which may allow for the connection of various I/O devices 514 (e.g., keyboards, displays, mouse devices, pen input, etc.) to the lightweight computing device 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. I/O device interface 504 may provide an interface for capturing data from one or more input devices integrated into lightweight computing device 500, such as touchscreens, biometric data monitors (e.g., heartrate monitors), cameras, microphones, or so on. Additionally, the memory 508 is included to be representative of a random access memory. Furthermore, the storage 510 may be a disk drive. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes a lightweight computing device security application 520. Lightweight computing device security application generally includes an application repository scanner 522, report generator 524, and remediation engine 526.

Application repository scanner 522 generally searches application repository 530 in storage 510 for applications installed on lightweight computing device 500. As discussed, application repository scanner 522 may execute when lightweight computing device security application 520 is initially installed on lightweight computing device 500 and/or when lightweight computing device security application 520 receives a request for application data from the corresponding security application on the mobile device 120 that is paired with lightweight computing device 500. Application repository scanner 522 can obtain the application package names for the applications installed on lightweight computing device 500 and transmit the list of application package names to report generator 524 for transmission to security application 124 executing on mobile device 120. In some cases, application repository scanner 522 can generate hash values representing each of the applications installed on lightweight computing device 500 and provide the hashed values to report generator 524.

Report generator 524 generally receives information from application repository scanner 522 and packages the information into one or more messages for transmission to security application 124 executing on mobile device 120. Report generator 524 generally packages the information received from application repository scanner 522 into one or more messages using application programming interface (API) functionality for transmitting data as part of a remote procedure call, transferring binary data objects between lightweight computing device 500 and mobile device 120, or other data transfer mechanisms for transmitting data between lightweight computing device 500 and mobile device 120.

Remediation engine 526 generally receives data from mobile device 120 identifying applications installed on lightweight computing device that are security risks and, in some cases, remediation instructions for each application identified as a security risk. In cases where remediation engine 526 receives a list of applications that are security risks without associated remediation instructions, remediation engine 526 can determine whether to, for example, delete an application, block access to input devices, block access to network interfaces, or take other actions to prevent an application identified as a security risk from exfiltrating data to an untrusted destination. In some cases, where remediation engine 526 receives a list of applications that are security risks from mobile device 120 along with remediation instructions for each identified application, remediation engine 526 can perform the remediation procedures specified for each application.

As shown, storage 510 includes an application repository 530. Application repository 530 generally provides storage space for users to install applications from a connected mobile device 120 to the lightweight computing device 500. In some cases, applications are transferred from mobile device 120 to application repository 530 through a lightweight computing device management console 122 at the mobile device 120. Application repository 530 may, in some cases, expose the application package name of each application installed on lightweight computing device 530 to lightweight computing device security application 520. As discussed above, lightweight computing device security application 520 can use application package name data to inform a mobile device 120 of the applications installed on lightweight computing device 500 and request that security application 124 on mobile device 120 identify applications stored in application repository 530 that are security vulnerabilities.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain or store a program.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

While the foregoing is directed to embodiments of the present disclosure, other and further embodiments of the disclosure may be devised without departing from the basic scope thereof, and the scope thereof is determined by the claims that follow.

What is claimed is:

1. A method for scanning for security threats on a lightweight computing device, comprising:
   receiving, from a mobile device, a software package including a lightweight computing device security application;
   transmitting, to the mobile device, information identifying at least a first application installed on the lightweight computing device;
   receiving, from the mobile device, information identifying the first application as being a known security threat; and
   remediating a security threat posed by the identified application.

2. The method of claim 1, wherein the information identifying at least the first application installed on the lightweight computing device comprises an application package name for the at least the first application installed on the lightweight computing device.

3. The method of claim 1, wherein the information identifying at least the first application installed on the lightweight computing device comprises a cryptographic hash of the contents of the at least the first application installed on the lightweight computing device.

4. The method of claim 1, wherein remediating the security threat posed by the identified application comprises deleting the identified application.

5. The method of claim 1, wherein remediating the security threat posed by the identified application comprises blocking the identified application from accessing one or more input devices integrated into the lightweight computing device.

6. The method of claim 1, wherein the lightweight computing device comprises a wearable computing device.

7. The method of claim 1, wherein the software package including the lightweight computing device security application is received upon initially pairing the lightweight computing device with the mobile device.

8. The method of claim 1, wherein transmitting the information identifying the at least the first application installed on the lightweight computing device comprises transmitting one or more messages to the mobile device using a general purpose data transfer mechanism between the lightweight computing device and the mobile device.

9. A system, comprising: a processor; and
   a memory comprising instructions which, when executed by the processor, performs an operation for scanning for security threats on a lightweight computing device, the operation comprising:
   receiving, from a mobile device, a software package including a lightweight computing device security application;
   transmitting, to the mobile device, information identifying at least a first application installed on the lightweight computing device;
   receiving, from the mobile device, information identifying the first application as being a known security threat; and
   remediating a security threat posed by the identified application.

10. The system of claim 9, wherein the information identifying at least the first application installed on the lightweight computing device comprises at least one of:
   an application package name for the at least the first application installed on the lightweight computing device, or
   a cryptographic hash of the contents of the at least the first application installed on the lightweight computing device.

11. The system of claim 9, wherein remediating the security threat posed by the identified application comprises deleting the identified application.

12. The system of claim 9, wherein remediating the security threat posed by the identified application comprises blocking the identified application from accessing one or more input devices integrated into the lightweight computing device.

13. The system of claim 9, wherein the software package including the lightweight computing device security application is received upon initially pairing the lightweight computing device with the mobile device.

14. The system of claim 9, wherein transmitting the information identifying the at least the first application installed on the lightweight computing device comprises transmitting one or more messages to the mobile device using a general purpose data transfer mechanism between the lightweight computing device and the mobile device.

15. A non-transitory computer-readable medium comprising instructions which, when executed by one or more processors, performs an operation for scanning for security threats on a lightweight computing device, the operation comprising:
- receiving, from a mobile device, a software package including a lightweight computing device security application;
- transmitting, to the mobile device, information identifying at least a first application installed on the lightweight computing device;
- receiving, from the mobile device, information identifying the first application as being a known security threat; and
- remediating a security threat posed by the identified application.

16. The non-transitory computer-readable medium of claim 15, wherein the information identifying at least the first application installed on the lightweight computing device comprises at least one of:
- an application package name for the at least the first application installed on the lightweight computing device, or
- a cryptographic hash of the contents of the at least the first application installed on the lightweight computing device.

17. The non-transitory computer-readable medium of claim 15, wherein remediating the security threat posed by the identified application comprises deleting the identified application.

18. The non-transitory computer-readable medium of claim 15, wherein remediating the security threat posed by the identified application comprises blocking the identified application from accessing one or more input devices integrated into the lightweight computing device.

19. The non-transitory computer-readable medium of claim 15, wherein the software package including the lightweight computing device security application is received upon initially pairing the lightweight computing device with the mobile device.

20. The non-transitory computer-readable medium of claim 15, wherein transmitting the information identifying the at least the first application installed on the lightweight computing device comprises transmitting one or more messages to the mobile device using a general purpose data transfer mechanism between the lightweight computing device and the mobile device.

* * * * *